2,963,444

REACTIVATING NOBLE METAL CONTAINING CATALYSTS

William G. Nixon, Westchester, Ill., assignor, by mesne assignments, to Universal Oil Products Company, Des Plaines, Ill., a corporation of Delaware No Drawing. Filed May 29, 1958, Ser. No. 738,602

8 Claims. (Cl. 252—416)

The present application is a continuation-in-part of my co-pending application Serial No. 595,863, filed July 5, 1956, now abandoned.

This invention relates to the reactivation of deactivated noble metal catalytic composites, and is specifically directed toward a method for reactivating platinum-containing catalyst through the utilization of particular oxides of nitrogen without effecting the removal of the platinum component from said catalyst.

Catalytic composites containing metallic components have attained extensive commercial utility. Industries such as the pharmaceutical, detergent, petroleum, insecticidal, etc. utilize metal-containing catalysts for promoting a multitude of reactions among which are hydrogenation, cyclization, polymerization, hydrocracking, sulfonation, dehydrogenation, and isomerization.

Regardless of the particular industry and reaction, it is essential, for commercial acceptability, that the catalyst employed exhibit a prolonged capability of performing its intended function as well as a high degree of activity in promoting the particular reaction, or combination of reactions, which is intended. This is especially true when the metallic component is selected from the group comprising noble metal components, particularly platinum and/or palladium. Recent developments in the field of catalysis have resulted in exceptionally active catalysts consisting of relatively minor quantities of these comparatively expensive metallic components.

After extended periods of use, catalysts usually become deactivated and thereby lose their capability to perform as desired. This deactivation is seldom sudden; most often it occurs through a gradual, but significant, decline in activity until such time as the catalyst is no longer active to the necessary and desired degree. The deactivation may result from any one or a combination of adverse effects. These effects may, in turn, result from substances which are peculiar to a particular catalyst, and which either induce a change in the physical state of the components of the catalyst or result in a loss of said components. Catalyst deactivation may also be effected by the deposition of impurities in the form of solids covering the catalytically active centers and surfaces, shielding them from the materials being processed. Quite often, catalyst deactivation encompasses a change in the state of the metallic component. This change is particularly noticeable when the metallic component comprises a metal selected from the noble metal family. The change is usually an increase in the size of the metallic crystal, a change in the valence state and/or a change in its chemical or physical association with other components of the catalyst.

Generally the deposition of coke and other carbonaceous material is a direct cause of catalyst deactivation and usually exists in conjunction with any of the aforementioned causes of catalyst deactivation. A widely utilized method for regenerating a catalyst, which has become deactivated through the deposition of carbonaceous material, is by burning in a free oxygen-containing gaseous material, usually air, at elevated temperatures. This method removes coke and such carbonaceous material, and, to all visual appearances, produces an active catalyst. However, the degree of activity of the catalyst is quite often less than the activity of the same catalyst prior to use. This is due, usually, to the state of the metallic component which may not have been reverted to its original state, and, of greater import, may have been adversely affected by the oxidizing treatment during the removal of the carbonaceous material.

Catalyst which is thought to be effectively regenerated through the utilization of air-oxidation, will function acceptably for a period of time significantly less than that experienced with the same catalyst prior to regeneration. A second regeneration becomes necessary, which regeneration again produces a catalyst capable of functioning as desired for a period of time less than that obtained with the catalyst before such regeneration. Each successive regeneration results in a catalyst which exhibits a shorter period of acceptable activity, and eventually it becomes necessary to replace the entire charge of catalyst, further regeneration not being economically feasible.

The object of the present invention is to provide a method for reactivating a catalytic composite whereby the carbonaceous material is substantially completely removed, the metallic components thereof are reconstituted to their original highly active state, and a reactivated catalyst produced which possesses a high degree of activity coupled with the capability of functioning acceptably for an extended period of time.

In one embodiment, the present invention provides a method for reactivating a deactivated noble metal-refractory inorganic oxide catalytic composite which comprises treating said deactivated composite with an oxide of nitrogen selected from the group consisting of $N_2O_3$, $NO_2$, $N_2O_5$ and mixtures thereof, removing said oxide of nitrogen and thereafter subjecting said composite to a reducing treatment without effecting the removal of the noble metal component therefrom.

In a specific embodiment the present invention provides a method for reactivating a deactivated catalytic composite consisting of alumina and from about 0.1% to about 5% by weight of platinum, which method comprises oxidizing said deactivated composite in air at a temperature of from about 300° C. to about 700° C., treating the air-oxidized composite at a temperature within the range of about 25° C. to about 1000° C. with an oxide of nitrogen selected from the group consisting of $N_2O_3$, $NO_2$, $N_2O_5$ and mixtures thereof, removing said oxide of nitrogen with air at a temperature within the range of about 300° C. to about 700° C. and thereafter subjecting said composite to a reducing treatment with hydrogen at a temperature of from about 25° C. to about 1000° C. without removing the platinum component therefrom.

Although the method of the present invention is specifically directed toward the reactivation of catalysts comprising a noble metal component, catalysts containing other metallic components, in addition to the noble metal component, may be advantageously reactivated through its utilization. Other metals which may be combined with the noble metal component, usually platinum and/or palladium, include chromium, rhodium, nickel, tungsten, ruthenium, silver, vanadium, iron, gold, and rhenium, etc. Combinations of two or more of the different metals hereinabove listed for illustrative purposes, or compounds of these metals, may also be benefited through the utilization of the method of the present invention. It is understood that the metal components may exist within the composite in the elemental state in combination as oxides, halides, sulfides, etc., or as complex compounds of two or more.

Whatever the metallic component, whether a single or combination of metallic components, it is generally composited with a highly refractory inorganic oxide such as alumina, silica, zirconia, silica-alumina, silica-zirconia, silica-alumina-zirconia, silica-thoria, silica-alumina-thoria, alumina-magnesia, etc. These refractory inorganic oxides may be made through the use of any suitable procedure including separate, successive or co-precipitation means of manufacture, or they may be naturally occurring substances such as clays or earths which may be purified or activated through special treatment. The method of the present invention is not dependent upon the use of any particular refractory inorganic oxide. It has been found, however, that the functions of a platinum-containing catalyst are facilitated, and the benefits derived therefrom enhanced, through the utilization of alumina or alumina-silica.

Typical of the many methods available for the manufacture of catalyst is to prepare a refractory inorganic oxide, for example alumina, by the addition of an alkaline precipitant to an aqueous solution of a suitable aluminum salt. The metallic component may likewise be prepared, and added to the refractory inorganic oxide, in any suitable manner. A common method is to add an alkaline precipitant, such as ammonium hydroxide, to an aqueous solution of a salt of the metallic component to be employed, thereafter commingling the resulting mixture with the alumina. The entire mass is then washed and thereafter dried at a temperature within the range of about 200° C. to about 700° C. for a period of from about two hours to about 24 hours or more. The dried catalytic composite is then formed into any desired shape and size such as pills, powder, granules, etc. if said alumina is not already in the desired shape when the metallic component is combined therewith. Regardless of the metallic component, and the refractory inorganic oxide employed as the carrier material therefor, it is understood that the ultimate composite may be made in any suitable manner including separate, successive, or co-precipitation methods of manufacture.

Whatever the method of manufacture, the catalyst so produced, and ultimately deactivated in use, may be reactivated by the process of the present invention. As hereinbefore set forth, the present invention involves a method, for reactivating a deactivated catalyst, which utilizes specific treatments with $N_2O_3$, $NO_2$, $N_2O_5$ and/or mixtures thereof, and which will yield a catalyst with a high degree of activity and increase thereby the length of time during which the catalyst is capable of performing as desired. It is preferred to subject the deactivated catalyst to oxidation prior to treating such catalyst with one of the aforementioned oxides of nitrogen. The oxidation is effected at elevated temperatures of from about 300° C. to about 700° C. in the presence of a free oxygen-containing gaseous material. Air is preferred due to its natural abundance, the economical feasibility of its utilization and the fact that the carbonaceous material deposited upon the catalyst will be substantially completely removed thereby. In addition, air, being a source of an abundant supply of free oxygen, readily oxidizes the various components of the catalyst, and prepares the same for the subsequent treatment with the oxide of nitrogen. Thus, it is seen that the oxides of nitrogen, hereinbefore set forth, are not employed for the purpose of utilizing any oxidizing tendencies which they might possess. The precise action which takes place between the metallic component and the oxide of nitrogen is not definitely known. However, X-ray diffraction techniques have indicated that the metals, particularly platinum, undergo a change in crystallization size, which change is a decrease therein, and which is believed to cause the platinum to become distributed more evenly and thoroughly throughout the composite. It is understood that the method of the present invention is by no means limited unduly to this particular theory.

It is understood that the oxides of nitrogen need not necessarily be employed in a pure state. They may be utilized as mixtures comprising two or more and including $NO_2$ and $N_2O_3$, $N_2O_5$ and $NO_2$, etc. They may be admixed with various diluents such as air, nitrogen, carbon dioxide, etc. Other compounds and mixtures of compounds which either yield the oxides of nitrogen or form them in situ may be suitably employed. For example, $N_2O_5$ is known to yield $N_2O_4$, (an equilibrium form of $NO_2$) at the conditions specific to the present invention.

To further improve the activity of the catalyst, it is desirable to subject said catalyst to a reducing treatment. It is essential to the method of the present invention that the catalyst be stripped of the oxide of nitrogen prior to effecting said reducing treatment. A convenient method of removing the oxide of nitrogen is by sweeping the catalytic composite with a gaseous substance not having a reducing action on said oxide of nitrogen. Examples of suitable sweeping agents are air, nitrogen, carbon dioxide, various inert gases, mixtures of the same, etc. It should be noted that the method of the present invention particularly excludes the use of nitric oxide (NO) which exhibits an inherent reducing action, and nitrous oxide ($N_2O$) which has been found inapplicable for the purpose of reconstituting the metallic component.

Briefly, the preferred method of reactivating a deactivated catalyst comprising a platinum component composited with a refractory inorganic oxide such as alumina, is to air-oxidize said catalyst at a temperature of from about 300° C. to about 700° C. for the purpose of substantially completely removing coke and other carbonaceous material therefrom. The air-oxidized catalyst is then subjected to the action of an oxide of nitrogen selected from the group consisting of $N_2O_3$, $NO_2$, $N_2O_5$ and mixtures thereof, at a temperature in excess of 25° C., having an upper limit of about 800° C. to about 1000° C. The treatment with the oxide of nitrogen is followed by sweeping the composite with air, to remove traces of said oxide of nitrogen, and thereafter subjecting the composite to a reducing treatment at a temperature in excess of 25° C. with an upper limit of about 1000° C. The preferred method employs a temperature of from about 300° C. to about 700° C. for the air-oxidation, sweeping, oxide-of-nitrogen, and reducing treatments. The reducing treatment may be omitted in those instances where, as a normally integral part of the process for which the catalyst is intended, the reactivated catalyst is first subjected to the action of a suitable reducing agent. Hydrogen is preferred for use in the present invention due to its high degree of reducing power, and the fact that the use thereof does not adversely affect the various components of the catalyst. It is understood that the method of the present invention may employ either downflow, upflow or crossflow in a closed vessel or countercurrent or concurrent flow through a fixed, fluidized or continuously moving bed of catalyst. It is further understood that the method of the present invention may be practiced without removing the catalyst from the reaction zone in which it is employed, or the catalyst may be removed and deposited in a separate confined zone or upon a suitable moving belt.

The following example is introduced to illustrate further the method of the present invention and to indicate the benefits afforded through the utilization thereof. It is not intended that the present invention be limited unduly to the specific materials and conditions involved therein.

*Example*

An alumina carrier material was prepared from a mixture of equal volumes of a 28% by weight solution of hexamethylene tetramine in water and an aluminum chloride hydrosol containing 12% by weight of aluminum and 10% by weight of combined chloride. The mixture was formed into spheres by the oil-drop method, and subsequently aged in accordance with standard aging practices. The aged spheres were washed, dried to a temperature of 650° C. and calcined at that temperature.

One hundred and thirty grams of the calcined spheres were soaked in 229 milliliters of a water solution of 99 milliliters of chloroplatinic acid containing 9.92 milligrams of platinum per milliliter. After one hour the spheres were evaporated to dryness, and thereafter oxidized at a temperature of 500° C. The spheres, after being impregnated with the platinum component and oxidized, were soaked in a solution of ammonium nitrate. This treatment with ammonium nitrate serves to remove effectively the chloride component from the catalyst. This procedure was employed in order to have the experimental catalyst conform to what might be expected from a catalyst which had been employed in a particular process for an extended period of time. When in use, a catalyst, originally containing combined chloride, will lose such chloride gradually through an apparent leaching or stripping action brought about by the material being processed. In other words, a deactivated catalyst will generally comprise the carrier material, the metallic component and will be contaminated with excessive quantities of coke and carbonaceous material.

The catalyst, now consisting of platinum and alumina, was subjected to a stream of carbon monoxide at an elevated temperature of 500° C. for a period of one hour. The use of carbon monoxide to cause the deactivation of platinum-containing catalysts is effective in producing a catalyst similar to those which have been deactivated in normal use. Quite often, the carbon monoxide treatment is more severe, and yields a catalyst which is deactivated to a greater degree than that resulting from normal use. The deactivated catalyst was then divided into two portions, a first portion being subjected to a particular activity test which consisted of reducing the catalyst with hydrogen at 500° C. and atmospheric pressure, and passing normal heptane over said catalyst at a temperature of 325° C., atmospheric pressure, a liquid hourly space velocity of 2.4 (liquid hourly space velocity is defined as the volume of liquid charge per hour per volume of catalyst within the reaction zone), in an atmosphere of hydrogen equivalent to an 8:1 mol ratio of hydrogen to normal heptane. The volume percent conversion of normal heptane to toluene, under the above conditions, is indicative of the activity of the catalyst. The above described activity test was selected intentionally because of its severity, and small improvements in small numbers are, therefore, highly significant.

A second portion of the carbon monoxide-deactivated catalyst was subjected to the method of the present invention by being placed in a furnace tube and brought to a temperature of 500° C. A stream of air was passed therethrough for a period of one hour at this temperature. This was followed by a stream of $NO_2$ at a rate of 50 cc. per minute, for a period of about 5 minutes, and further followed by a stream of air at a temperature of 500° C. for a period of one hour to remove traces of the $NO_2$. The catalyst was then subjected to a reducing treatment at a temperature of 500° C. in a stream of hydrogen for a period of one hour. The furnace tube was cooled, the catalyst removed and subjected to the activity test as hereinbefore defined.

The deactivated catalyst portion indicated a toluene yield of 0.015 volume percent, whereas the catalyst which had been reactivated through the method of the present invention indicated a toluene yield of 1.7 volume percent. In addition, a distinct color change was observed in visually comparing the carbon monoxide-deactivated catalyst and the $NO_2$-treated portion. The carbon monoxide-deactivated catalyst exhibited a dark black color, whereas the $NO_2$-treated portion was effectively white. The catalyst, as first manufactured, that is before either the deactivation or reactivation procedures, exhibited a light cream color. This is significant for it indicates a definite change in the state of the metal component, which change is believed to involve a decrease in the size of the metal crystal and/or a change in the association of the platinum component with the other components of the catalytic composite.

The foregoing specification and example clearly illustrate the preferred method of effecting the present invention, and indicate the benefits derived through the utilization thereof in reactivating a deactivated platinum-containing composite. It is not intended, however, that the method of the present invention be limited unduly beyond the scope and spirit of the appended claims.

I claim as my invention:

1. A method for reactivating a deactivated noble metal-refractory inorganic oxide catalytic composite without removing said noble metal therefrom, which comprises oxidizing said deactivated composite in air at a temperature of from about 300° C. to about 700° C., treating the air-oxidized composite with an oxide of nitrogen selected from the group of $N_2O_3$, $NO_2$, $N_2O_5$ and mixtures thereof at a temperature within the range of about 25° C. to about 1000° C., stripping said oxide of nitrogen from said composite with a gas not having a reducing action on said oxide of nitrogen, and thereafter subjecting said composite to a reducing treatment in an atmosphere of hydrogen at a temperature of from about 25° C. to about 1000° C.

2. The method of claim 1 further characterized in that said noble metal comprises platinum.

3. The method of claim 1 further characterized in that said refractory inorganic oxide comprises alumina.

4. The method of claim 1 further characterized in that said refractory inorganic oxide comprises alumina and silica.

5. The method of claim 1 further characterized in that said gas is air.

6. A method for reactivating a deactivated alumina-platinum catalytic composite without effecting the removal of platinum from said composite, which comprises oxidizing said composite in air at a temperature of from about 300° C. to about 700° C., treating the air-oxidized composite, at a temperature within the range of about 25° C. to about 1000° C., with an oxide of nitrogen selected from the group consisting of $N_2O_3$, $NO_2$, $N_2O_5$ and mixtures thereof, stripping said oxide of nitrogen from said composite with a gas not having a reducing action on said oxide of nitrogen, and thereafter subjecting said composite to a reducing treatment with hydrogen at a temperature of from about 25° C. to about 1000° C.

7. The method of claim 6 further characterized in that said deactivated catalytic composite comprises from about 0.1% to about 5.0% by weight of platinum.

8. A method for reactivating a deactivated catalytic composite consisting of alumina and from about 0.1% to about 5.0% by weight of platinum without effecting the removal of platinum from said composite, which method comprises oxidizing said deactivated composite in air at a temperature of from about 300° C. to about 700° C., treating the air-oxidized composite at a temperature of from about 25° C. to about 1000° C. with an oxide of nitrogen selected from the group consisting of $N_2O_3$, $NO_2$, $N_2O_5$ and mixtures thereof, removing said oxide of nitrogen with air at a temperature of from about 300° C. to about 700° C. and thereafter subjecting said composite to a reducing treatment with hydrogen at a temperature of from about 25° C. to about 1000° C.

References Cited in the file of this patent

UNITED STATES PATENTS

| | | |
|---|---|---|
| 1,678,627 | Jaeger | July 24, 1928 |
| 2,381,659 | Frey | Aug. 7, 1945 |

FOREIGN PATENTS

| | | |
|---|---|---|
| 744,429 | Great Britain | Feb. 8, 1956 |